Patented Sept. 11, 1934

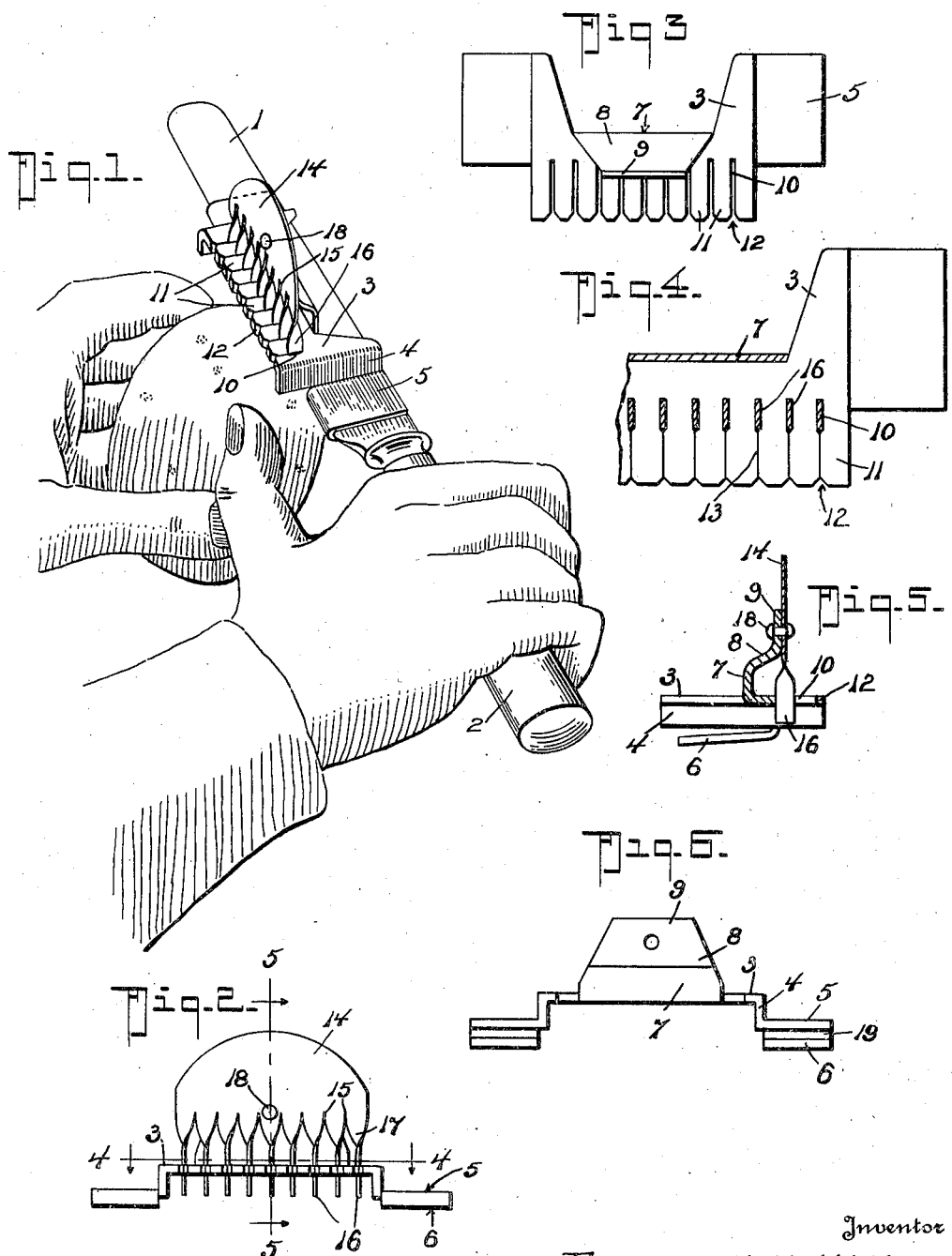

1,973,383

UNITED STATES PATENT OFFICE 1,973,383

SLICER

Frederick H. Miller, Portland, Oreg.

Application October 12, 1933, Serial No. 693,343

6 Claims. (Cl. 146—210)

The invention has for its object to provide an improved simple hand manipulated potato slicer to slice potatoes for frying in shoe-string, julienne, or French styles, having provision for forming the horizontal slice and vertical slices necessary.

The invention further has for its object to provide an improved attachment capable of being removably mounted upon an ordinary table knife, having provision thereon to provide the plurality of vertical slices necessary and so positioned upon the knife as to cause the cutting edge of the latter to form the main horizontal or slice cut, the cooperative relation of the table knife blade and the vertical slice cutting element being such that the vertical slicing is accomplished immediately preceding the horizontal knife cut.

Another object is to provide a vegetable cutter of the general type described in my Patent No. 1,778,161 issued October 14, 1930, but of such construction as to reduce the cost of manufacture to a minimum.

With the above and other objects in view that will hereinafter appear the invention still further resides in the novel details of construction, combination and arrangement of parts, all of which will be first fully described in the following detail description, then be specifically pointed out in the appended claims, reference being had to the accompanying drawing, in which:

Figure 1 is a perspective view showing the invention mounted for use.

Figure 2 is a front elevation of the invention.

Figure 3 is a plan view of the attachment frame having the blade slots.

Figure 4 is an enlarged detail horizontal cross section taken on the line 4—4 of Figure 2.

Figure 5 is a vertical cross section taken on the line 5—5 of Figure 2.

Figure 6 is a rear elevation of the attachment frame.

In the drawing, in which like numerals of reference indicate like parts in all the figures, 1 is the blade and 2 the handle of an ordinary table knife upon which the invention is shown mounted.

The attachment comprises a frame body 3, the advance edges of which are bent to form the sides 4 and the extensions 5, the said extensions 5 comprising the top parts of spring clips defining groveways 19, and 6 indicates the bottom parts of the said clips.

A flange is bent from the base 3 upwardly at 7, inwardly at 8 and upwardly again at 9 to form a suitable support for the cutting element 14.

The base 3 has slots 10 to hold the vertical cutting blades 16. 13 represents the slots after they have been closed by the flattening of the fingers 11 which have a bevelled portion 12.

The base of the cutting element which is represented by 14 is slit at 15 and twisted at right angles at 17 to form the cutting blades 16.

The said cutting element is attached to the base 3, after the blades 16 are slipped through the slots, by a rivet 18.

After the blades 16 have been slipped between the bevels 12 into the slots 10, and the rivet 18 secured, the fingers 11 are mashed in front of the blades 16 to close the slots as at 13 (Figure 4) thereby holding the blades 16 tightly in the innermost extremities of the slots 10 and providing a smooth, practically uninterrupted surface in front of as well as in back of the blades 16.

From the foregoing description, taken in connection with the accompanying drawing, it is thought that the novel details of construction, the manner of use and the advantages of my invention will be readily apparent to those skilled in the art to which it appertains.

What I claim is:

1. In slicing attachments for knife blades; a frame body having provision to fit on the knife blade, said frame body having slots to provide fingers, and having a supporting member above said fingers, a plate slit to provide a set of cutting blades one for each slot, means securing said plate to said supporting member with said cutting blades projecting through said slots.

2. In slicing attachments for knife blades; a frame body having provision to fit on the knife blade, said frame body having slots to provide fingers, and having a supporting member above said fingers, a plate slit to provide a set of cutting blades one for each slot, means securing said plate to said supporting member with said cutting blades projecting through said slots, and said fingers having bevelled ends constituting V-shaped entrances to said slots.

3. In slicing attachments for knife blades; a frame body having provision to fit on the knife blade, said frame body having slots to provide fingers, and having a supporting member above said fingers, a plate slit to provide a set of cutting blades one for each slot, means securing said plate to said supporting member with said cutting blades projecting through said slots, said fingers having bevelled ends constituting V-shaped entrances to said slots, and means for closing said slots after the cutting blades are in place.

4. In slicing attachments for knife blades; a frame body having provision to fit on the knife blade, said frame body having slots to provide fingers, and having a supporting member above said fingers, a plate slit to provide a set of cutting blades one for each slot, means securing said plate to said supporting member with said cutting blades projecting through said slots, said cutting blades lying in front of the cutting edge of said knife.

5. In slicing attachments for knife blades; a frame body having provision to fit on the knife blade, said frame body having slots to provide fingers, and having a supporting member above said fingers, a plate slit to provide a set of cutting blades one for each slot, means securing said plate to said supporting member with said cutting blades projecting through said slots, said cutting blades being twisted to lie at right angles to the plane of said plate.

6. In slicing attachments for knife blades; a frame body having provision to fit on the knife blade, said frame body having slots to provide fingers, and having a supporting member above said fingers, a plate slit to provide a set of cutting blades one for each slot, means securing said plate to said supporting member with said cutting blades projecting through said slots, said frame body being offset so as to locate said fingers in a plane above that containing the knife.

FREDERICK H. MILLER.